US010040357B2

(12) United States Patent
Reuter et al.

(10) Patent No.: US 10,040,357 B2
(45) Date of Patent: Aug. 7, 2018

(54) METHOD FOR OPERATING AN ELECTRIFIED MOTOR VEHICLE

(71) Applicants: Robert Bosch GmbH, Stuttgart (DE); SEG AUTOMOTIVE GERMANY GMBH, Stuttgart (DE)

(72) Inventors: Axel Reuter, Vaihingen an der Enz (DE); Oliver Dieter Koller, Weinstadt (DE)

(73) Assignees: ROBERT BOSCH GMBH, Stuttgart (DE); SEG AUTOMOTIVE GERMANY GMBH, Stuttgart (DE)

( * ) Notice: Subject to any disclaimer, the term of this patent is extended or adjusted under 35 U.S.C. 154(b) by 346 days.

(21) Appl. No.: 15/069,626

(22) Filed: Mar. 14, 2016

(65) Prior Publication Data

US 2016/0297302 A1    Oct. 13, 2016

(30) Foreign Application Priority Data

Apr. 8, 2015    (DE) .................. 10 2015 206 189
Feb. 16, 2016   (DE) .................. 10 2016 202 306

(51) Int. Cl.
*B60L 3/12*    (2006.01)
*B60L 3/00*    (2006.01)

(52) U.S. Cl.
CPC ............... *B60L 3/12* (2013.01); *B60L 3/003* (2013.01); *B60L 3/0084* (2013.01); *B60L 2240/36* (2013.01)

(58) Field of Classification Search
None
See application file for complete search history.

(56) References Cited

U.S. PATENT DOCUMENTS

| 5,531,122 A * | 7/1996 | Chatham | G01B 5/30 340/438 |
| 6,160,342 A * | 12/2000 | Nishikawa | H01T 13/41 313/136 |
| 6,184,784 B1 * | 2/2001 | Shibuya | B60C 23/0408 180/167 |
| 9,789,766 B2 * | 10/2017 | Koller | B60L 3/0061 |

(Continued)

FOREIGN PATENT DOCUMENTS

| DE | 4107207 A1 | 9/1992 |
| DE | 101 61 998 A1 | 7/2003 |

(Continued)

*Primary Examiner* — Shelley Chen
(74) *Attorney, Agent, or Firm* — Norton Rose Fulbright US LLP; Gerard Messina

(57) ABSTRACT

A method for operating a motor vehicle having a vehicle electrical system, which includes at least one electrical or electronic component, which experiences a load during an operation of the motor vehicle, an accumulated load of the at least one component being ascertained, at least one type of damage contributing to the load being ascertained, a service life of the at least one component to be expected as a result of the ascertained accumulated load being ascertained, and at least one variable damaging the at least one component during operation, which is selected as a function of the at least one type of damage, being changed in a load-reducing direction if the service life to be expected of the at least one component deviates from a setpoint service life.

15 Claims, 3 Drawing Sheets

(56) References Cited

U.S. PATENT DOCUMENTS

| | | | | |
|---|---|---|---|---|
| 2002/0161535 | A1* | 10/2002 | Kawakita | G06F 17/5018 |
| | | | | 702/42 |
| 2003/0158803 | A1* | 8/2003 | Darken | G06Q 10/087 |
| | | | | 705/36 R |
| 2008/0107960 | A1* | 5/2008 | Furukawa | H01M 4/685 |
| | | | | 429/163 |
| 2013/0257450 | A1* | 10/2013 | Omori | G01R 31/026 |
| | | | | 324/543 |
| 2014/0091700 | A1* | 4/2014 | Yoshida | H01T 13/05 |
| | | | | 313/141 |
| 2015/0134219 | A1* | 5/2015 | Poulin | B60K 31/00 |
| | | | | 701/70 |
| 2015/0158374 | A1* | 6/2015 | Li | B60L 11/12 |
| | | | | 701/22 |
| 2016/0001657 | A1* | 1/2016 | Koller | B60L 3/003 |
| | | | | 307/10.1 |
| 2016/0076972 | A1* | 3/2016 | Kang | C22C 38/00 |
| | | | | 702/34 |
| 2017/0352203 | A1* | 12/2017 | Jansson | G07C 5/0808 |

FOREIGN PATENT DOCUMENTS

| | | |
|---|---|---|
| DE | 10 2005 048 533 A1 | 4/2007 |
| DE | 10 2006 039 592 A1 | 2/2008 |
| DE | 10 2009 024 422 A1 | 1/2011 |
| DE | 10 2012 213 057 A1 | 1/2014 |
| DE | 10 2012 214 346 A1 | 2/2014 |
| DE | 10 2014 100 037 A1 | 7/2014 |
| DE | 10 2013 203 661 A1 | 9/2014 |
| GB | 2 150 774 A | 7/1985 |
| GB | 2 253 957 A | 9/1992 |

\* cited by examiner

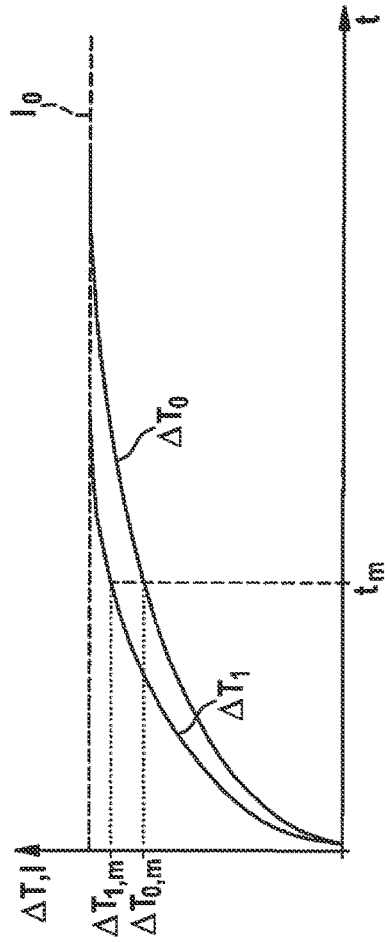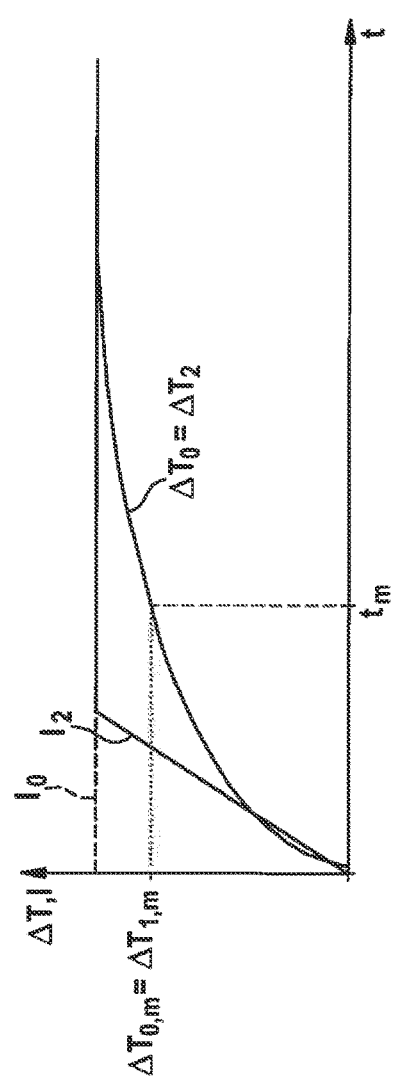

METHOD FOR OPERATING AN ELECTRIFIED MOTOR VEHICLE

FIELD OF THE INVENTION

The present invention relates to a method for operating an electrified motor vehicle having a vehicle electrical system and at least one electrical or electronic component.

BACKGROUND INFORMATION

As a result of the increasing electrification of the drive train of modern motor vehicles, electrical or electronic components such as, for example, semiconductors, in particular, in the form of switching elements such as transistors are used to an increasing extent. These are exposed to the inhospitable external conditions of the engine compartment, for example, passive temperature lifts. Passive temperature lifts are created by the waste heat of the internal combustion engine heating the engine compartment while the vehicle is driving.

A particularly high load acts on electronic components of the converter of the electric machine in such motor vehicles, which experience additional loads from active temperature lifts due to the self-heating at high current. Large current amplitudes are typically reached during motor-driven boost processes and generator-driven recuperation processes (in vehicles having correspondingly operable electric machines). The electronic components of the converter are functionally critical components, since their failure results in a non-functionality of the complete electric machine.

The service life of electronic components and, thus, that of the converter of the electric machine as well, is a function essentially of the cyclization with active and passive temperature changes, since in assembly and connection technology materials having different expansion coefficients are used. These different expansion coefficients (so-called thermal mismatch) result in mechanical stresses during a thermal heating or cooling of the assembly and connection technology.

Since the number and amplitude of boost and recuperation processes depend greatly on the application, i.e., among other things, on the driving behavior of the driver (aggressive, defensive) and/or the traffic situations, in which a corresponding motor vehicle is predominantly moved (city traffic, freeway), the configuration of the electronic components in the converter represents a technical challenge.

In order to avoid a premature and uncontrolled failure of electrical or electronic components, methods for estimating their residual service life may be used. In such methods, the residual service life is determined with the aid of a thermal model and by storing temperature lifts.

A method for adapting a residual service life of a semiconductor in a motor vehicle is discussed, for example, in DE 10 2013 203 661 A1. For this purpose, a load influencing factor is reduced when a deviation is detected of an actual load from a setpoint load of the semiconductor. A more precise description of the initiated measures is not given, however.

The need exists, therefore, for improved ways of operating electrified motor vehicles, which include corresponding electrical or electronic components in their vehicle electrical system, and with the aid of which a more reliable operation is facilitated with no unexpected failures and losses of comfort.

SUMMARY OF THE INVENTION

According to the present invention, a method having the features described herein is provided. Advantageous embodiments are the subject matter of the further descriptions herein and of the following description.

A method according to the present invention is used to operate a motor vehicle having a vehicle electrical system, which includes at least one electrical or electronic component, which experiences a load during an operation of the motor vehicle. In the process, an accumulated load of the at least one component is ascertained; in addition, at least one type of damage contributing to the load is ascertained. In addition, the service life of the at least one component to be expected as a result of the ascertained accumulated load is ascertained, and at least one variable damaging the at least one component during operation, which is selected as a function of the at least one type of damage, is changed if the service life to be expected of the at least one component deviates from a setpoint service life.

If the component is loaded continuously over the setpoint service life, or on average with a setpoint load, it may be assumed that it reaches the end of the setpoint service life, i.e., does not fail prematurely. If the component is loaded continuously over the setpoint service life, or on average with a lower load than the setpoint load, it may be assumed that it exceeds the setpoint service life, i.e., that it will not fail for a fairly long time after the end of the setpoint service life. If, on the other hand, the component is loaded continuously over the setpoint service life, or on average with a higher load than the setpoint load, it may be assumed that the component will possibly fail before the end of the setpoint service life, i.e., it will not reach its setpoint service life. It is understood that the setpoint service life may include a safety factor so that it may be ensured that even negative outliers do not also fail before the end of the setpoint service life in the event of a specimen tolerance.

These components are loaded as a result of an aging of the assembly and connection technology of electrical or electronic components, i.e., their thermal properties, for example, heat dissipation, are impaired. This results in a greater load of the assembly and connection technology, since in this case greater temperature lifts and a higher mean temperature occur, which further accelerates the aging process. This is a so-called self-excitation effect.

With a method according to the present invention, it is therefore possible to specifically change a variable damaging the electrical or electronic component, which may involve, in particular, semiconductors or semiconductor switches such as, for example, transistors and the like, if, for example, a disproportionate load of the component, manifested, for example, by a reduced heat dissipation, is determined. It is particularly advantageous in this case that specifically the damaging variable is changed which, with the type of damage ascertained, has influence or at least the greatest influence on the load. Thus, the load does not increase as compared, for example, to a non-aged assembly and connection technology and the aforementioned self-excitation effect is avoided.

The type of damage in this case may be ascertained, for example, with the aid of a thermal step response. If the component is acted upon by a current pulse, the component heats up. It is therefore possible, based on a model, to obtain a piece of information about the state of the assembly and connection technology of the component. The type of damage in such case may be detected by the profile of the thermal step response.

The at least one variable may be changed only if the ascertained accumulated load deviates from an accumulated setpoint load corresponding to the setpoint service life by more than one threshold value. Thus, a certain tolerance range may be predefined, in which too great a load may still be tolerated, since this load, for example, will not yet invariably result in a total failure of the component.

The threshold value becomes advantageously smaller in increasing proportion to the setpoint service life at the point in time the expected service life is ascertained. Thus, it is possible to allow a greater tolerance range at the beginning of the setpoint service life, for example, which may still be compensated for during the operating period until the setpoint service life is reached. In contrast, the tolerance range may be kept narrower toward the end of the setpoint service life, since a compensation is possible only to a minimal extent.

The accumulated load is advantageously ascertained by ascertaining a number and level of temperature lifts the component has passed through. For this purpose, the temperature profile in the component may be modelled on-line via a thermal model, for example. It is noted here that the real temperature profile in the component, in particular, in the interior of the component, cannot be measured, which is why a modeling is advantageous. Using a classification system (so-called rainflow counting), this temperature profile may then be reduced to load temperature lifts. Thus, using a stored load model or service life model of the component, it is possible to ascertain the load as a result of each single temperature lift and, by adding them up, the instantaneous accumulated load. Conventional components are configured namely to withstand unharmed a certain number of temperature lifts of a certain level, the number and level mutually influencing one another, i.e., lower temperature lifts are more frequently possible than higher temperature lifts. If the actually sustained temperature lifts in number and level are then recorded, it is possible to ascertain from these the instantaneous accumulated load and the anticipated residual service life for unchanged conditions.

It is advantageous if a severity of the at least one type of damage is ascertained and if the at least one variable is changed as a function of the severity. This makes a finer adjustment of the variable possible. The variable may, for example, be changed proportionately to the severity or else also within multiple predefined ranges, for example, to which the ascertained severity is assigned. The severity of the type of damage in this case may be detected based on the profile of the thermal step response, for example, based on its change as compared to a profile in the normal state.

The at least one variable includes a current amount, in particular, if the at least one type of damage includes a degradation of soldered joint. A degradation such as, for example, a breakdown of a soldered joint, in particular, of the solder, results in an increase in the thermal resistance at this location. This creates a more intense heating with the current load remaining the same. This type of damage is detectable, for example, by a temperature higher than normal in the thermal step response. This effect may be specifically counteracted by a specific change, for example, a reduction of the current amount.

The at least one variable advantageously includes a current gradient, in particular, if the at least one type of damage includes a delamination. If delamination effects, i.e. peeling of layers, occur, the thermal mass of the assembly and connection technology is reduced and a steeper temperature gradient forms. This steeper temperature gradient is detectable, for example, in the thermal step response. This may be specifically counteracted by a change, for example, a reduction of the current gradient. Load cases, which are limited in time in such a way that the thermal balance is not achieved, result in this case also in larger temperature lifts. This is the case, for example, during recuperation phases of an electric machine in the motor vehicle.

It is also advantageous if the at least one variable includes a voltage, in particular, a voltage amount and/or a voltage gradient. The voltage in this case may be increased if it is detected that the setpoint service life is not reached. By increasing the voltage, it is possible namely to reduce the current while the power output remains the same. It is also conceivable that a higher lower limit, for example, 48 volts, is predefined for a permissible voltage range, which often falls between 36 and 54 volts in motor vehicle electrical systems.

Additional types of damage such as, for example, diffusion processes and the like may, analogously to the two types of damage described, be tested with respect to their effects on the load, in particular, thermal resistances and masses. An occurring degradation of the thermal behavior may then be compensated for, for example, by interventions in the current amount and/or current gradient.

The at least one variable is advantageously changed in a load-reducing direction if the service life to be expected is less than the setpoint service life. If a current amount or a current gradient is the variable, this is reduced, in particular. In this way further damage may be limited and, thus, the setpoint service life of the component may be reached.

It is advantageous if the at least one variable is changed in a load-increasing direction if the service life to be expected is greater than the setpoint service life. If a current amount or a current gradient is the variable, this is increased, in particular. In this way, the setpoint service life may, for example, be fully utilized. However, the at least one variable is, in particular, changed at most to a setpoint value for a regular operation, since a change, in particular, an increase beyond this could have another damaging effect on the component.

It is particularly advantageous if a dead time for other changes is provided for the at least one component if the at least one variable is changed. This may avoid a frequent change of the operating mode of the component.

The component may be a component of an electric machine of the motor vehicle, in particular, a component of a converter of the electric machine. Severe loads of the installed electrical or electronic components, in particular, in the converter occur, especially when using the electric machine as a recuperation machine. For this reason, an application of the method according to the present invention in this case is particularly advantageous in order to actually reach a desired service life of the component and, thus, also of the electric machine.

A processing unit according to the present invention, for example, a control unit of a motor vehicle is, in particular, programmed to carry out a method according to the present invention.

The implementation of the method in the form of software is also advantageous, since this involves particularly low costs, in particular, if an executing control unit is also used for other tasks and is therefore present anyway. Suitable data media for providing the computer program are, in particular, magnetic, electrical and optical data media such as hard disks, flash memories, EEPROMs, DVDs and the like. It is also possible to download a program from computer networks (Internet, Intranet etc.).

Additional advantages and embodiments of the present invention result from the description and the attached drawing.

The present invention is schematically depicted in the drawing on the basis of an exemplary embodiment and is described below with reference to the drawing.

BRIEF DESCRIPTION OF THE DRAWINGS

FIG. 2 shows profiles of heat inputs in a component with and without load in a case not according to the present invention.

FIG. 3 shows profiles of heat inputs in a component with and without load when carrying out a method according to the present invention in a specific embodiment.

DETAILED DESCRIPTION

Figure 1:
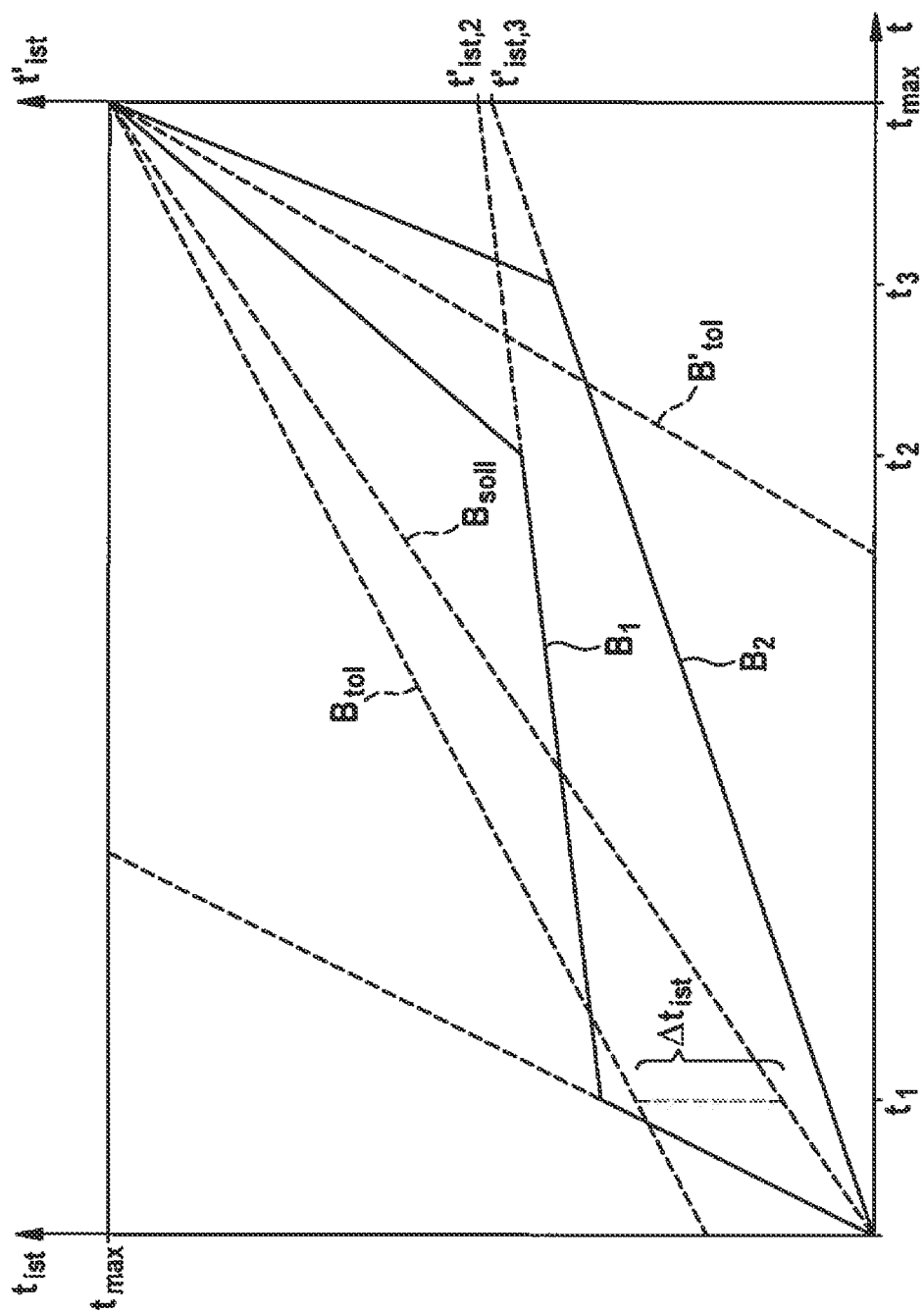
FIG. 1 shows accumulated load profiles of two components in a diagram over an operating period, in each case when carrying out a method according to the present invention in a specific embodiment.

In FIG. 1, profiles of accumulated loads $B_1$ and $B_2$ of two components are shown in a diagram over an operating period t, in each case when carrying out a method according to the present invention in a specific embodiment. The two components may, for example, be semiconductor elements in a converter of an electric machine used as a recuperation machine.

However, the component may also be a carbon brush, via which the excitation current is transferred to the rotor of an electric machine.

Additional examples of components in which the method may be employed are switching MOSFETS of a DC-DC converter and platinum components (such as, for example, ceramic capacitors) of a platinum DC-DC converter.

Still another example of such a component is a battery in a vehicle electrical system.

Also plotted in the diagram on the left y-axis are an instantaneous accumulated service life $t_{actual}$ and a service life to be expected $t'_{actual}$. Accumulated service life $t_{actual}$ in this case corresponds to a consumed portion of an entire setpoint service life $t_{max}$ of a component based on the ascertained accumulated load. Service life to be expected $t'_{actual}$ corresponds to a theoretical service life of a component calculated using a linear extrapolation starting from the point in time the load is ascertained.

A profile of an accumulated setpoint load $B_{setpoint}$ is also shown, which corresponds to an idealized, uniform load over the entire operating period t, so that precisely the setpoint service life $t_{max}$ is reached. An upper and a lower tolerance range for the accumulated load are plotted with $B_{tol}$ and $B'_{tol}$, each of which represents a threshold value, which an instantaneous accumulated load can or must exceed or fall below, so that a change is carried out. As operating period t increases, the tolerance limits approach more closely accumulated setpoint load $B_{setpoint}$, i.e., the threshold values become increasingly smaller as operating period t increases. The upper and the lower threshold values in this case are not necessarily identical in terms of amount, but may be predefined depending on need.

A method according to the present invention is explained below with reference to the two accumulated loads $B_1$ and $B_2$. Accumulated load $B_1$ of a first component is ascertained at point in time $t_1$. As mentioned above, the number of temperature lifts may be ascertained for this purpose based on a thermal model and a temperature profile. A linear extrapolation, which yields an expected service life of the first component (no longer depicted in FIG. 1, but visible based on the dashed line), may be carried out, based on the accumulated load at point in time $t_1$ and, if necessary, previously ascertained accumulated loads. Here, it becomes clear that this expected service life at point in time t clearly exceeds setpoint service life $t_{max}$.

It is also apparent that the accumulated load at point in time $t_1$ exceeds accumulated setpoint load $B_{setpoint}$ by more than a threshold value $\Delta t_{actual}$ at the same point in time. Therefore, a variable, for example, a current amount flowing in the first component, is changed, in the present case, in particular, reduced. In the further course of accumulated load $B_1$, it can be seen from point in time $t_1$ on that the accumulated load increases less strongly over operating period t than before point in time $t_1$.

In this regard, it is noted that the variable may be changed only if this is really necessary to avoid a failure of the component, i.e., if, for example, an unchanged operation is no longer possible even within a tolerance. The threshold values may be selected accordingly for this purpose. The reason for this is that, for example, a reduction of the variable results in impairments in the operation of the elements which the component includes. However, a limitation may be better as compared to a total failure.

At point in time $t_2$, an instantaneous value of accumulated load $B_1$ is again ascertained, from which a service life to be expected, in the present case, $t'_{actual, 2}$, is ascertained in the same way as at point in time $t_1$. It is apparent here that service life to be expected $t'_{actual,2}$ is less than setpoint service life $t_{max}$. Therefore, the associated current amount is changed again, in the present case, increased. The first component would not in fact fail without this increase, since setpoint service life $t_{max}$ is not reached, however, the remaining residual service life may be optimally utilized by the increase.

It is also apparent from the profile of accumulated load $B_1$ that, after point in time $t_1$ at which a change in current is made, a dead time is introduced, i.e., no change in the current amount is made until point in time $t_2$. This avoids a frequent change in the operating mode of the first component and, therefore, also an additional load source.

At this point, it is noted that such an increase of the variable as at point in time $t_2$, if necessary, only makes sense up to a desired or required setpoint value during regular operation, since an increase beyond this could potentially otherwise have a damaging effect on the component in the form of an overload and, moreover, is usually unnecessary for a proper operation.

At point in time $t_3$, accumulated load $B_2$ of a second component is ascertained. A linear extrapolation, which yields an expected service life $t'_{actual,3}$ of the second component, may be carried out based on the accumulated load at point in time $t_3$ and, if necessary, additional previously ascertained accumulated loads. In this case, it is clear that service life to be expected $t'_{actual,3}$ is less than setpoint service life $t_{max}$ at point in time $t_3$.

It is also apparent that accumulated load $B_2$ is below tolerance limit $B'_{tol}$ and, therefore, a certain threshold value is below accumulated setpoint load $B_{setpoint}$. Therefore, an associated variable, for example, a current gradient, is increased, so that the remaining service life up to setpoint service life $t_{max}$ is optimally utilized.

FIG. 2 shows current l through or in a component and heat input $\Delta T$ into the component over time t in a case not according to the present invention. Current $l_0$ in this case represents a current flowing during regular operation of the component. $\Delta T_0$ indicates a profile of the heat input when the component is not loaded and $\Delta T_1$ indicates a profile when the component is loaded.

It is apparent in this case that heat input $\Delta T_{1,m}$ at measuring time $t_m$ is greater when the component is loaded than heat input $\Delta T_{0,m}$ at the same measuring time $t_m$ when the component is not loaded. A heat input increased in such manner results in a load additional to the already existing load resulting from regular operation (assuming the load is unchanged), when current $l_0$ remains the same beyond additional operating cycles.

FIG. 3 shows current l through or in a component and heat input $\Delta T$ into the component over time t in a case according to the present invention. Current $l_0$ in this case represents a current flowing during regular operation of the component. $\Delta T_0$ indicates a profile of the heat input when the component is not loaded.

When the load is detected, the profile of the current is then changed from profile $l_0$ to profile $l_2$. In the present case, this is a change of the current gradient at the start of the current flow. $\Delta T_2$ then indicates a heat input associated with the reduced current gradient or current $l_2$ when the component is loaded. Heat inputs $\Delta T_{0,m}$ and $\Delta T_{2,m}$ are the same at a measuring time $t_m$.

Thus, the additional load of the component added by the current flow is not, or is only, a function of the load accumulated over the operating period. The self-excitation effect mentioned at the outset is thus avoided and a setpoint service life of the component may be reached, independently of a load actually occurring during the operating period.

Figure 4:
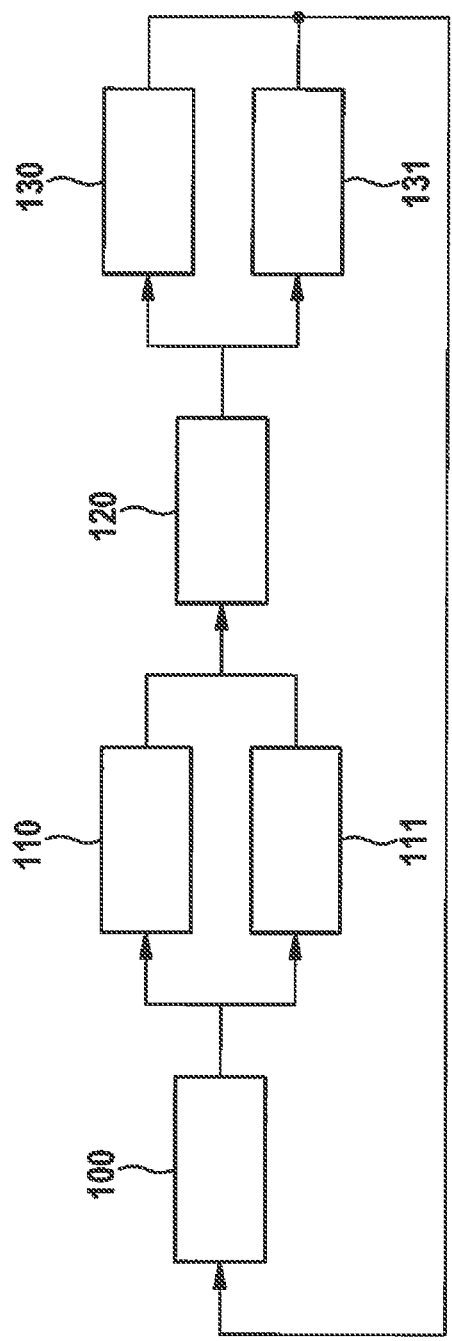
FIG. 4 shows a sequence of a method according to the present invention in a specific embodiment.

FIG. 4 shows in a block diagram a possible sequence of a method according to the present invention. In a step 100, an instantaneous accumulated load of a component is ascertained.

The types of damage and their severities or intensities are also ascertained.

In a step 110, a first type of damage, for example, a broken solder, and the severity thereof, are ascertained. In a step 111, a second type of damage, for example, a delamination, and the associated severity are analogously identified. Additional types of damage, if provided, may be identified accordingly.

If the component is the carbon brush, the type of damage identified may be the wear.

If the component is switching MOSFETS or platinum components, in particular of the DC-DC-converter, the type of damage diagnosed may be solder aging.

If the component is the battery, the type of damage may be determined to be a loss of power and capacity, which may result due to high cyclization and/or to high load throughput.

In a step 120, the measures associated with the types of damage to be identified and their intensities may then be ascertained, for example, in a table (Look-up table) stored in a control unit.

In a step 130, the ascertained measure for the first type of damage is then implemented. For example, a current amount may be limited as a function of the ascertained severity. Similarly, in a step 131, the ascertained measure for the second type of damage is implemented. Here, for example, a current gradient may be reduced according to the ascertained severity. This sequence may be repeated after a certain operating period, depending on the desired or required implementation.

What is claimed is:

1. A method for operating a motor vehicle having a vehicle electrical system, which includes at least one electrical or electronic component, which experiences a load during an operation of the motor vehicle, the method comprising:
    ascertaining an accumulated load of the at least one component;
    ascertaining at least one type of damage contributing to the load;
    ascertaining a service life of the at least one component to be expected as a result of the ascertained accumulated load; and
    changing at least one variable damaging the at least one component during operation, which is selected as a function of the at least one type of damage, in a load-reducing direction if the service life to be expected of the at least one component deviates from a setpoint service life.

2. The method of claim 1, wherein the at least one variable is changed only if the ascertained accumulated load deviates from an accumulated setpoint load corresponding to the setpoint service life by more than a threshold value.

3. The method of claim 2, wherein the threshold value becomes smaller with increasing proportion to the setpoint service life at the point in time the service life to be expected is ascertained.

4. The method of claim 1, wherein the accumulated load is ascertained by ascertaining a number and level of temperature lifts through which the component passes.

5. The method of claim 1, wherein a severity of the at least one type of damage is ascertained and the at least one variable is changed as a function of the severity.

6. The method of claim 1, wherein the at least one variable includes a current amount, and/or includes a current gradient.

7. The method of claim 1, wherein the at least one variable includes at least one of a voltage amount and a voltage gradient.

8. The method of claim 1, wherein the at least one variable is changed in a load-reducing direction if the service life to be expected is less than the setpoint service life.

9. The method of claim 1, wherein the at least one variable is changed in a load-reducing direction, if the service life to be expected is greater than the setpoint service life.

10. The method of claim 9, wherein the at least one variable is changed at most up to a setpoint value for a regular operation.

11. The method of claim 1, wherein a dead time is provided for the at least one component for additional changes, if the at least one variable is changed.

12. The method of claim 1, wherein the component is a component of an electric machine of the motor vehicle, the component being a converter of the electric machine.

13. A processor unit for operating a motor vehicle having a vehicle electrical system, which includes at least one electrical or electronic component, which experiences a load during an operation of the motor vehicle, comprising:
    a processor arrangement configured to perform the following:
        ascertaining an accumulated load of the at least one component;
        ascertaining at least one type of damage contributing to the load;
        ascertaining a service life of the at least one component to be expected as a result of the ascertained accumulated load; and
        changing at least one variable damaging the at least one component during operation, which is selected as a function of the at least one type of damage, in a load-reducing direction if the service life to be expected of the at least one component deviates from a setpoint service life.

14. A computer readable medium having a computer program, which is executable by a processor, comprising:
a program code arrangement having program code for operating a motor vehicle having a vehicle electrical system, which includes at least one electrical or electronic component, which experiences a load during an operation of the motor vehicle, by performing the following:
ascertaining an accumulated load of the at least one component;
ascertaining at least one type of damage contributing to the load;
ascertaining a service life of the at least one component to be expected as a result of the ascertained accumulated load; and
changing at least one variable damaging the at least one component during operation, which is selected as a function of the at least one type of damage, in a load-reducing direction if the service life to be expected of the at least one component deviates from a setpoint service life.

15. The method of claim 1, wherein the at least one variable includes a current amount, in particular, if the at least one type of damage includes a degradation of a soldered joint, and/or includes a current gradient, in particular, if the at least one type of damage includes delamination.

* * * * *